United States Patent
Dodgen et al.

[15] 3,658,376
[45] Apr. 25, 1972

[54] JACK AND TIE-DOWN SYSTEM FOR A VEHICLE MOUNTED CAMPER

[72] Inventors: John N. Dodgen; Kenneth R. Johnson, both of Humboldt, Iowa

[73] Assignee: Dodgen Industries, Inc., Humboldt, Iowa

[22] Filed: Oct. 5, 1970

[21] Appl. No.: 77,937

Related U.S. Application Data

[63] Continuation-in-part of Ser. No. 9,003, Feb. 5, 1972.

[52] U.S. Cl. ..........................296/23 MC, 296/35 A, 214/515
[51] Int. Cl. ............................................................B60p 3/34
[58] Field of Search............296/23 MC, 35 A; 214/512, 515

[56] References Cited

UNITED STATES PATENTS

| | | | |
|---|---|---|---|
| 3,580,599 | 5/1971 | Dodgen | 214/515 |
| 3,409,154 | 11/1968 | Rasmussen | 214/515 |
| 3,547,480 | 12/1970 | Ward | 296/23 MC |

*Primary Examiner*—Philip Goodman
*Attorney*—Zarley, McKee & Thomte

[57] ABSTRACT

A jack and tie-down system for a vehicle mounted camper including first and second jacks secured to the lower front corners of the camper and third and fourth jacks secured to the rearward end of the camper. The first and second jacks each include a vertically movable leg portion extending downwardly therefrom and having a U-shaped support member secured to the lower ends thereof and extending therebetween. The support member serves as a stand for the front end of the camper when the camper is removed from the vehicle and extends beneath the vehicle frame and engages the same to serve as a tie-down means for the front end of the camper when the camper is on the vehicle. First and second arms are pivotally connected at their upper ends to the lower rearward end of the camper and have the rearward ends of first and second frame members selectively pivotally connected thereto. The forward ends of the first and second frame members are pivotally connected to a support member which is secured to and extends between the lower ends of the third and fourth jacks. A pair of ground engaging wheel members are rotatably secured to the first and second frame members. First and second brackets are secured to the rearward end of the vehicle frame and are adapted to receive the support member extending between the lower ends of the third and fourth jacks when the third and fourth jacks are raised to serve as a tie-down for the rearward end of the camper and also serving as a means for aligning the wheel members secured to the frame members. The support member extending between the lower ends of the third and fourth jacks serves as a stand for the rearward end of the camper when the camper is removed from the vehicle. A spring means is operatively connected to the axle supporting the wheel members for yieldably urging the wheel members into ground engagement whether the third and fourth jacks are in their raised or lowered positions. The selective pivotal connection of the first and second frame members with the first and second arms provides a means for varying the amount of weight carried by the wheel members.

8 Claims, 7 Drawing Figures

PATENTED APR 25 1972 3,658,376
SHEET 1 OF 2

INVENTORS
JOHN N. DODGEN
KENNETH R. JOHNSON
BY
Zarley, McKee & Thomte
ATTORNEYS

INVENTORS
JOHN N. DODGEN
KENNETH R. JOHNSON
BY
Zarley, McKee & Thomte
ATTORNEYS

JACK AND TIE-DOWN SYSTEM FOR A VEHICLE MOUNTED CAMPER

This is a continuation-in-part application of the application, Ser. No. 9,003 having a filing date of Feb. 5, 1970.

Conventional vehicle mounted campers usually have a front pair of jacks secured to the front portion of the camper and a rear pair of jacks secured to the front portion of the camper and a rear pair of jacks secured to the rear end of the camper to support the camper when it is removed from the vehicle and to level the camper when it is being used while on the vehicle. These conventional jacks usually have tripod shoes or the like on the lower ends thereof which must be removed and stored when the vehicle is being driven. A separate tie-down system is also needed in the conventional campers to secure the front part of the camper to the vehicle to prevent it from moving with respect to the vehicle when the vehicle is being used on the highway. It has been a common practice to extend a turnbuckle means between the vehicle body and the camper in an attempt to prevent the camper from moving with respect to the vehicle. The use of a turnbuckle means requires that holes be drilled in the vehicle body and camper and is unsatisfactory since the vehicle body has a tendency to bend or slightly move with respect to the vehicle frame. Thus, the camper still bobs, waves or moves on the vehicle due to wind action thereon and also tends to move when the vehicle strikes a bump due to the relative movement of the vehicle body with respect to the vehicle frame.

The jack and tie-down system disclosed in the co-pending application is a vast improvement over the conventional camper jack and tie-down systems and the system disclosed herein is a distinct improvement over the invention disclosed in the co-pending application since a means is disclosed herein for properly aligning the auxiliary wheel members and since a means is provided for maintaining the auxiliary wheels in ground engagement when the rear jacks are lowered. Further, the instant disclosure represents a significant advance in the art due to the fact that a means is provided for selectively varying the amount of weight which is to be carried by the auxiliary wheels.

Therefore, it is the pricipal object of this invention to provide a jack and tie-down system for a vehicle mounted camper.

A further object of this invention is to provide a jack and tie-down system for a vehicle mounted camper which prevents the camper from moving with respect to the vehicle frame.

A further object of this invention is to provide a jack and tie-down system for a vehicle mounted camper which provides a roll bar type of production for the camper as well as a brace protection for the vehicle in case of collision or upset.

A further object of this invention is to provide a jack and tie-down system for a vehicle mounted camper which eliminates the need of bolting turnbuckles or clamps to the vehicle bed.

A further object of this invention is to provide a jack and tie-down system for a vehicle mounted camper which permits the camper to be easily leveled.

A further object of this invention is to provide a jack and tie-down system for a vehicle mounted camper which eliminates the necessity of removing tripod shoes from camper jacks when the vehicle is being transported.

A further object of this invention is to provide a jack and tie-down system for a vehicle mounted camper which permits the camper to be quickly and easily removed from the vehicle.

A further object of this invention is to provide a jack and tie-down system for a vehicle mounted camper which provides increased stability for the camper when it is being supported on the ground.

A further object of this invention is to provide a jack and tie-down system for a vehicle mounted camper which includes means for aligning the auxiliary wheels at the rearward end of the camper.

A further object of this invention is to provide a jack and tie-down system for a vehicle mounted camper which includes means for selectively varying the amount of weight to be carried by the auxiliary wheels.

A further object of this invention is to provide a jack and tie-down system for a vehicle mounted camper which includes means for maintaining the auxiliary wheels in ground engagement when the rear jacks are lowered.

A further object of this invention is to provide a jack and tie-down system for a vehicle mounted camper which is durable in use, refined in appearance and economical of manufacture.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings, in which:

Figure 1:
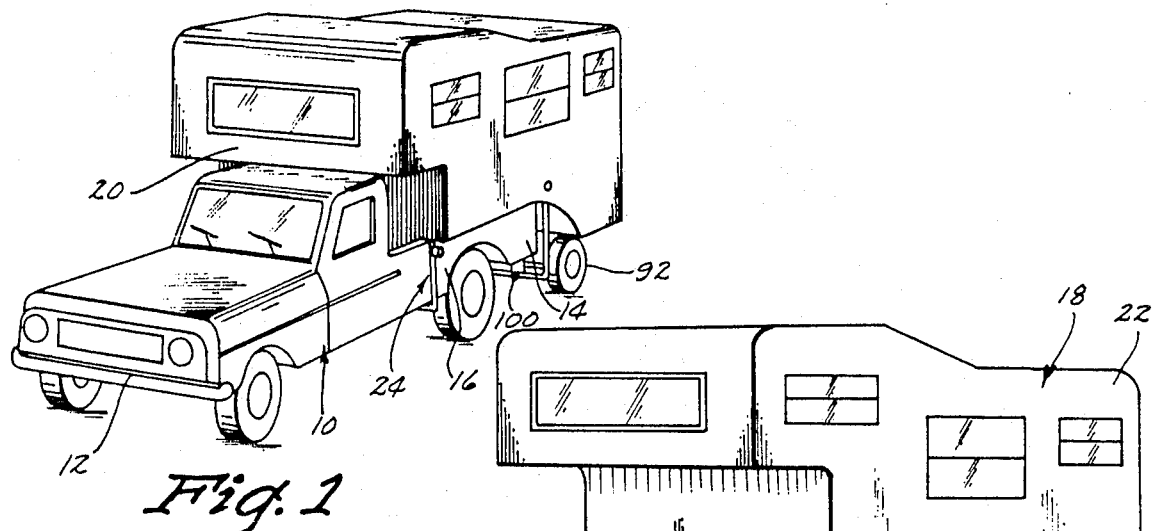
FIG. 1 is a front perspective view of a camper mounted on a vehicle with the apparatus of this invention secured thereto, the camper including an auxiliary wheel assembly.

The numeral 10 refers generally to a vehicle having a forward end 12 and a rearward end 14. Vehicle 10 is of the "pickup truck" type and has a bed 16 provided at the rearward end thereof adapted to receive a camper 18 thereon having a forward end 20 and a rearward end 22. The drawings illustrate the fact that the camper 18 includes an auxiliary wheel assembly at the rearward end thereof for supporting the rearward end of the camper which will be described in more detail hereinafter.

Figures 2, 3:
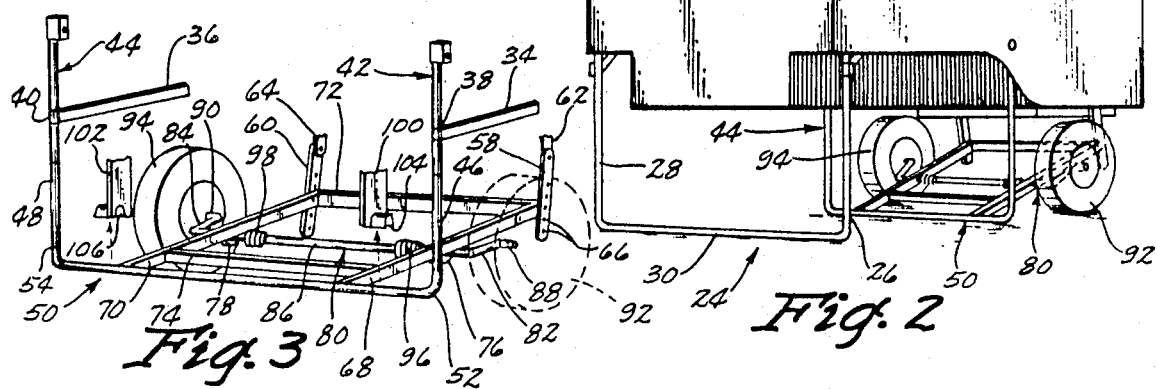
FIG. 2 is a view similar to FIG. 1 except that the camper has been removed from the vehicle.
FIG. 3 is a front perspective view of the rear jack assembly.

The numeral 24 refers generally to the jack and tie-down assembly which is secured to the forward end of the camper and which is substantially identical to the jack and tie-down assembly which is disclosed in the copending application. The numerals 26 and 28 refer to jacks which are conveniently secured at their upper ends to the lower front corners of the camper 18 and which have a support member 30 secured to the lower ends thereof and extending therebetween. The jacks 26 and 28 may be raised and lowered in conventional fashion as described in the co-pending application. FIG. 2 illustrates the camper 18 having been removed from the truck 10. It can be seen that the jacks 26 and 28 have been lowered so that the horizontal portion of the support member 30 engages the ground so as to serve as a stand for the forward end of the camper. FIG. 1 illustrates the camper 18 on the vehicle and the horizontal portion of the support member 30 extends beneath the vehicle frame and engages the same to serve as a tie-down assembly for the front end of the camper. The engagement of the support member 30 with the truck frame positively prevents the forward end of the camper from bobbing or waving since the frame moves with the vehicle as a unit so that the entire vehicle and camper absorb the bumps together rather than separately. Further, the jacks 26 and 28 provide a roll bar type of protection for the camper as well as a brace protection for the vehicle in case of collision or upset. The tie-down system for the forward part of the camper eliminates the necessity of using turnbuckles or clamp arrangements which would ordinarily be bolted to the pickup bed. With the system disclosed herein, there are no holes to drill in the pickup bed and the frame mounting disclosed herein provides a much safer locking device than that previously possible. It can be appreciated that the design of the jacks 26 and 28 eliminates the necessity of removing the shoes from the jacks for storing thereof which is an objectionable characteristic of the campers designed previously to that of the coöpending application.

Figure 4:
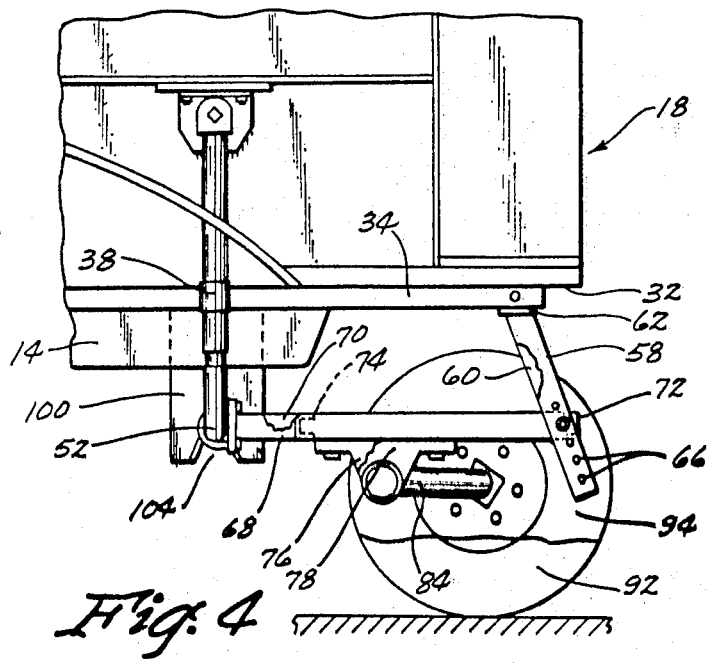
FIG. 4 is a side elevational view of the rear jack assembly.
Figure 6:
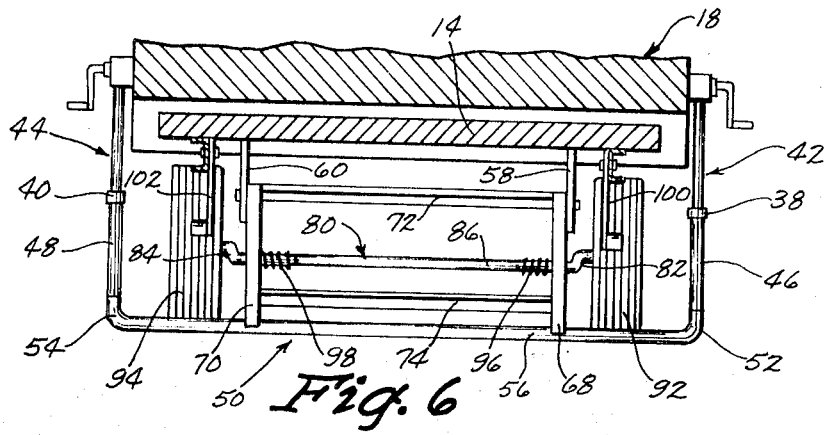
FIG. 6 is a front view of the rear jack and wheel assembly.
Figure 7:
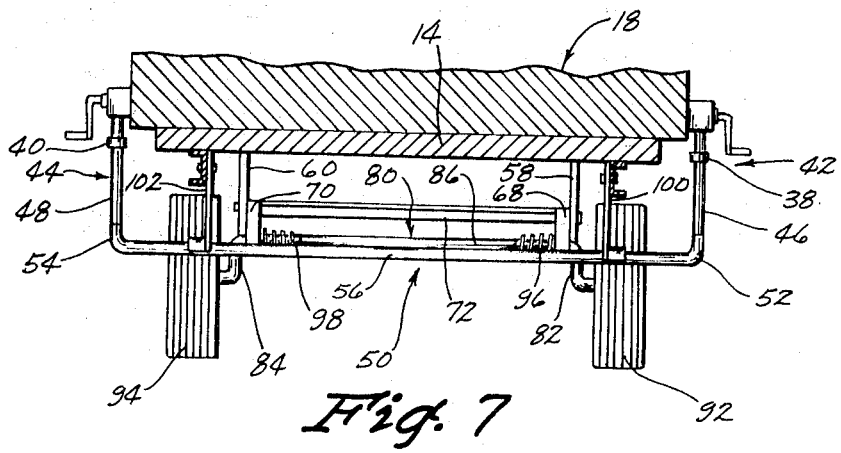
FIG. 7 is a view similar to FIG. 6 except that the rear jack assembly has been raised.
Figure 5:
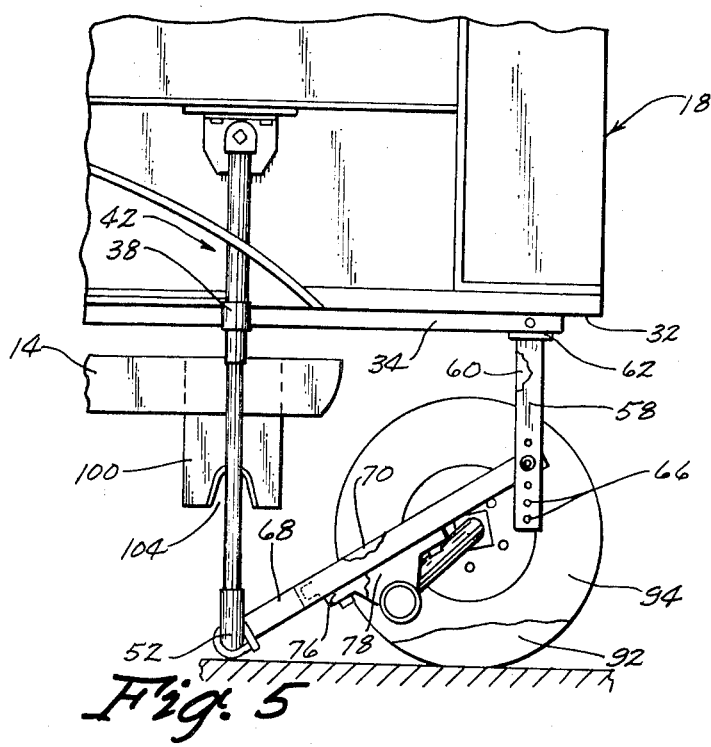
FIG. 5 is a view similar to FIG. 4 except that the rear jacks have been lowered.

As seen in FIG. 4, camper 18 includes a floor portion 32 at the rearward end thereof. Angle brackets 34 are secured to the floor portion 32 of camper 18 by bolts or the like and extend beneath the floor portion 32 as illustrated in FIG. 4. Angle brackets 34 and 36 have sleeves 38 and 40 provided at their forward ends which are secured to jacks 42 and 44 respectively. The upper ends of jacks 42 and 44 are secured to opposite sides of the camper 18 adjacent their upper ends by any convenient means and have leg portions 46 and 48 extending downwardly therefrom respectively. The leg portions 46 and 48 may be raised or lowered in conventional fashion. A U-shaped support 50 is connected at its ends 52 and 54 to the lower end of leg portions 46 and 48 respectively by bolts or the like. Support member 50 includes a horizontal portion 56 which is adapted to engage the ground or other supporting surface when the jacks 42 and 44 have been lowered so that the support member 50 serves as a stand means for the rearward end of the camper when the camper has been removed from the vehicle. The jacks 42 and 44 may also be selectively operated to level the camper on the vehicle when the camper is on the vehicle and the camper is being used. Angle brackets 34 and 36 serve to tie the jacks to the camper and provide additional stability and support to the jacks.

Arms 58 and 60 are pivotally connected at their upper ends to brackets 62 and 64 respectively which are secured to the underside of the floor portion 32 by any convenient means such as bolts or the like. Each of the arms 58 and 60 are provided with a plurality of spaced apart bolt openings 66 formed therein adjacent the lower end thereof. Frame members 68 and 70 are selectively pivotally connected at their rearward ends to the arms 58 and 60 respectively by means of bolts extending through the desired bolt opening 66. Braces 72 and 74 extend between the frame members 68 and 70 to provide additional strength and stability to the assembly.

The forward ends of frame members 68 and 70 are pivotally connected to the horizontal portion 56 of support member 50 by any convenient means such as U-bolts or the like extending therearound. Axle supports 76 and 78 are secured to the frame members 68 and 70 respectively and have an axle 80 rotatably mounted therein. Axle 80 includes axle portions 82 and 84 which extend rearwardly from the ends of axle portion 86. Axle 80 also includes outwardly extending axle portions 88 and 90 which extend outwardly from the rearward ends of the axle portions 82 and 84. Auxiliary wheel members 92 and 94 are rotatably mounted on the axle portions 88 and 90 respectively by any convenient means. Springs 96 and 98 embrace axle portion 86 inwardly of the axle supports 76 and 78 and are operatively secured thereto to yieldably urge the rotation movement of axle portion 86 with respect to the supports 76 and 78 so that the wheel members 92 and 94 are yieldably urged into ground engagement.

Brackets 100 and 102 are secured by bolts or the like to the rearward ends of the vehicle frame members and extend downwardly therefrom. The brackets 100 and 102 have inverted substantially U-shaped openings 104 and 106 formed in the lower ends thereof which are adapted to receive the horizontal portion 56 of support member 50 when jacks 42 and 44 have been raised. The receiving of the horizontal portion 56 in the openings 104 and 106 not only serves as a tie-down means for the rearward end of the camper but also serves to align the auxiliary wheel members 92 and 94 in the proper position with respect to the vehicle since the connection thereof serves to straighten or align the camper with respect to the vehicle. The plurality of bolt openings 66 in the arms 58 and 60 permit the relationship of the frame members 68 and 70 to be varied with respect thereto to vary the amount of weight that will be carried by the auxiliary wheel members which also determines the amount of weight that will be transferred to the front wheels of the vehicle. For example, the auxiliary wheels will carry more weight if the frame members 68 and 70 are pivotally connected to the lowermost bolt opening 66 than if they were pivotally connected to the uppermost bolt opening 66. Thus, the relationship of the arms 58 and 60 with respect to the frame members 68 and 70 permits proper weight distribution for all three axles.

The pivotal connection of the upper ends of the arms 58 and 60 with respect to the camper and the pivotal connection of the arms 58 and 60 with respect to the frame members 68 and 70 together with the design of the axle and the spring means associated therewith causes the auxiliary wheel members 92 and 94 to always stay on the ground when the rear jacks are lowered due to the lever action involved. This feature provides a strong and safe support at all times when the camper is being unloaded from the vehicle. In conventional campers, the rear auxiliary wheels are raised out of ground engagement when the rear jacks are lowered. Thus, increased stability is provided for the camper through the means described herein for mounting the auxiliary wheels. The design of the assembly at the rearward end of the camper also permits the rear bumper of the vehicle to be left on the vehicle.

Thus it can be seen that an extremely unique jack and tie-down system for a vehicle mounted camper has been provided which accomplishes at least all of its stated objectives.

We claim:

1. In a jack and tie-down system for a vehicle mounted camper, the camper having rearward and forward ends and opposite sides, the vehicle having rearward and forward ends and a frame means, comprising, first and second jack means secured to said camper adjacent the forward end thereof and being length adjustable from first to second positions, said first and second jack means adapted to engage a supporting surface to support the forward end of the camper when said first and second jack means have been moved to their second positions, first and second spaced apart arms pivotally secured at their upper ends to the camper adjacent the rearward end thereof and extending downwardly therefrom, first and second elongated frame members pivotally connected at one end thereof to said first and second arms respectively and extending forwardly therefrom, a third jack means having upper and lower ends and being length adjustable from first to second positions, said third jack means being secured adjacent its upper end to said camper at one side thereof forwardly of the rearward end thereof, a fourth jack means having upper and lower ends and being length adjustable from first to second positions, said fourth jack means being secured adjacent its upper end to said camper at the other side thereof forwardly of the rearward end thereof, a support member secured to the lower ends of said third and fourth jack means and extending therebetween, said first and second frame members being pivotally secured at their forward ends to said support member, first and second wheel members connected to said first and second frame members intermediate the lengths thereof respectively, first and second brackets secured to the vehicle frame means extending downwardly therefrom adapted to detachably receive said support member to tie-down the rearward end of the camper to the vehicle when said third and fourth jack means have been moved to their first positions, said support member adapted to engage a supporting surface to support the rearward end of the camper when said third and fourth jack means have been moved to their second positions, and means connected to said wheel members for maintaining said wheel members in engagement with the supporting surface when said third and fourth jack means are in either of their first or second positions.

2. The system of claim 1 wherein first and second elongated supports are secured to the camper at the rearward end thereof and are secured at one end thereof to said third and fourth jack means respectively.

3. The system of claim 1 wherein each of said first and second brackets have an inverted substantially U-shaped opening extending upwardly into the lower ends thereof, said support member being a tubular member adapted to be received in said U-shaped openings to tie-down the rearward end of the camper and to align the first and second wheel members with respect to the vehicle frame means.

4. The system of claim 1 wherein said first and second frame members are selectively vertically adjustably secured to said first and second arms respectively to permit the amount of weight carried by said first and second wheel members to be selectively varied.

5. The system of claim 1 wherein said means connected to said wheel members comprises an axle rotatably secured to and extending between said first and second frame members, each end of said axle having an axle portion extending rearwardly therefrom and an outwardly extending axle portion at the rearwardly end of said rearwardly extending axle portion, said wheel members being rotatably mounted on said outwardly extending portions whereby the axis of rotation of said wheel members is rearwardly of the longitudinal axis of said axle, and a spring means connected to said axle yieldably urging said wheel members into engagement with the supporting surface.

6. The system of claim 5 wherein said spring means is a coil spring secured to and embracing said axle.

7. The system of claim 1 wherein a second support member is secured to and extends between the lower ends of said first and second jack means, said second support member adapted to extend beneath the vehicle and to engage the vehicle frame means to tie-down the forward end of the camper to the vehicle when said first and second jack means are in their said first positions.

8. In a jack and tie-down system for a vehicle mounted camper, the camper having rearward and forward ends and opposite sides, the vehicle having rearward and forward ends and a frame means, comprising,
first and second jack means secured to said camper adjacent the forward end thereof and being length adjustable from first to second positions, said first and second jack means adapted to engage a supporting surface to support the forward end of the camper when said first and second jack means have been moved to their second positions,
a third jack means having upper and lower ends and being length adjustable from first to second positions, said third jack means being secured adjacent its upper end to said camper at one side thereof forwardly of the rearward end thereof,
a fourth jack means having upper and lower ends and being length adjustable from first to second positions, said fourth jack means being secured adjacent its upper end to said camper at the other side thereof forwardly of the rearward end thereof,
said third and fourth jack means adapted to engage the ground when in their second positions and adapted to operatively engage the vehicle when in their first position,
a support means secured to said camper at the rearward end thereof,
an auxiliary wheel assembly on said support means adapted to support the rearward end of the camper,
means connecting said support means and said third and fourth jack means for maintaining the wheels of said auxiliary wheel assembly in a ground engaging position when said third and fourth jack means are in their first and second positions.

* * * * *